United States Patent
Yun et al.

(10) Patent No.: US 7,133,097 B2
(45) Date of Patent: Nov. 7, 2006

(54) APPARATUS FOR FORMING ALIGNMENT FILM OF LIQUID CRYSTAL DISPLAY DEVICE COMPRISING AN ALIGNMENT MATERIAL REMOVAL UNIT FOR BACKFLUSHING RESIDUAL ALIGNMENT MATERIAL AND A METHOD FOR FORMING ALIGNMENT FILM USING THE SAME.

(75) Inventors: Heon-Do Yun, Daegu (KR); Yong-Sang Byun, Gyeongsangbuk-Do (KR)

(73) Assignee: LG.Philips LCD. Co., Ltd., Seoul (KR)

( * ) Notice: Subject to any disclaimer, the term of this patent is extended or adjusted under 35 U.S.C. 154(b) by 146 days.

(21) Appl. No.: 10/787,766

(22) Filed: Feb. 27, 2004

(65) Prior Publication Data

US 2004/0169804 A1   Sep. 2, 2004

(30) Foreign Application Priority Data

Feb. 27, 2003   (KR) .................. 10-2003-0012465

(51) Int. Cl.
*G02F 1/1337* (2006.01)

(52) U.S. Cl. ..................................... 349/123; 349/187

(58) Field of Classification Search ........ 349/123–125, 349/106, 153, 187, 189, 190
See application file for complete search history.

(56) References Cited

U.S. PATENT DOCUMENTS 5,940,099 A * 8/1999 Karlinski .................... 347/70
6,149,262 A * 11/2000 Shiida et al. ................ 347/37
6,481,824 B1 * 11/2002 Hayakawa et al. .......... 347/24

FOREIGN PATENT DOCUMENTS

JP          09-166783         *  6/1997

* cited by examiner

Primary Examiner—Dung T. Nguyen
Assistant Examiner—Thoi V. Duong
(74) *Attorney, Agent, or Firm*—McKenna, Long & Aldridge, LLP

(57) ABSTRACT

A method for forming an alignment layer of a liquid crystal display device includes providing a substrate having a plurality of unit panels formed thereon, loading the substrate onto a stage, selectively dropping an alignment material onto unit panel areas by using an alignment material dropping unit having a plurality of heads, each of the plurality of heads having a plurality of holes, and removing the alignment material remaining on a surface of the holes using an alignment material removal unit connected to the alignment material dropping unit.

15 Claims, 4 Drawing Sheets

APPARATUS FOR FORMING ALIGNMENT FILM OF LIQUID CRYSTAL DISPLAY DEVICE COMPRISING AN ALIGNMENT MATERIAL REMOVAL UNIT FOR BACKFLUSHING RESIDUAL ALIGNMENT MATERIAL AND A METHOD FOR FORMING ALIGNMENT FILM USING THE SAME.

The present invention claims the benefit of Korean Patent Application No. 12465/2003 filed in Korea on Feb. 27, 2003, which is hereby incorporated by reference.

BACKGROUND OF THE INVENTION

1. Field of the Invention

The present invention relates to a method for fabricating a liquid crystal display device and, more particularly, to an apparatus for forming an alignment layer of a liquid crystal display device and method for forming an alignment layer using the same.

2. Description of the Related Art

With recent developments of various portable electronic devices, such as mobile phones, personal digital assistants (PDAs), and notebook computers, demand for light weight, thin profile, small flat panel display devices is increasing. Present research includes active development of the flat panel display devices including liquid crystal display (LCD) devices, plasma display panel (PDP) devices, field emission display (FED) devices, and vacuum fluorescent display (VFD) devices. Of these different devices, the LCD devices are actively being developed due to the simple mass-production techniques necessary to produce them, their easy driving systems, and implementation of high picture quality.

FIG. 1 is a cross sectional view of a liquid crystal display device according to the related art. In FIG. 1, a liquid crystal display device 1 includes a lower substrate 5, an upper substrate 3, and a liquid crystal layer 7 formed between the lower and upper substrates 5 and 3. The lower substrate 5 is a driving unit array substrate and includes a plurality of pixels (not shown), wherein each pixel includes a driving unit, such as a thin film transistor. The upper substrate 3 is a color filter substrate and includes a color filter layer for implementing a color.

A pixel electrode and a common electrode are respectively formed on the lower substrate 5 and the upper substrate 3. In addition, an alignment layer for aligning liquid crystal molecules of the liquid crystal layer 7 is formed on the pixel electrode and on the common electrode. The lower substrate 5 and the upper substrate 3 are attached by a sealing material 9, and the liquid crystal layer 7 is formed therebetween. The liquid crystal molecules of the liquid crystal layer 7 are driven by a driving unit formed at the lower substrate 5, wherein a quantity of light transmitted through the liquid crystal layer 7 is controlled to display an image.

FIG. 2 is a flow chart of a method for fabricating a liquid crystal display device according to the related art. In FIG. 2, the fabrication process of the liquid crystal display device is roughly divided into a driving unit array substrate process for forming a driving unit at the lower substrate 5, a color filter substrate process for forming the color filter at the upper substrate 3, and a cell process.

In FIG. 2, a step S101 includes forming a plurality of gate lines and a plurality of data lines on the lower substrate 5 using the driving device array process for defining a plurality of pixel areas. The step 101 includes formation of thin film transistors, and driving devices that are connected to the gate lines and the data lines at the pixel areas. In addition, the pixel electrode, which is connected to the thin film transistor through the driving device array process, is formed. The pixel electrode drives a liquid crystal layer when a signal is transmitted through the thin film transistor.

A step S104 includes formation of a color filter layer of R, G, and B colors, and formation of a common electrode on the upper substrate using the color filter process.

Steps S102 and S105 both include formation of alignment layers on the upper and lower substrates, wherein the alignment layers are rubbed to provide the liquid crystal molecules of the liquid crystal layer formed between the upper and lower substrates with an initial alignment and surface fixing force (i.e., pre-tilt angle and orientation direction).

A step S103 includes scattering a plurality of spacers onto the lower substrate for maintaining a uniform cell gap between the upper and lower substrates.

A step S106 includes formation of a sealing material along an outer portion of the upper substrate.

A step S107 includes attaching the upper and lower substrates together by compressing the upper and lower substrates together.

A step S108 includes dividing the attached upper and lower substrates into a plurality of individual liquid crystal panels.

A step S109 includes injection of the liquid crystal material into the liquid crystal panels through a liquid crystal injection hole, wherein the liquid crystal injection hole is sealed to form the liquid crystal layer.

A step S110 includes testing the injected liquid crystal panel.

Operation of the LCD device makes use of an electro-optical effect of the liquid crystal material, wherein anisotropy of the liquid crystal material aligns liquid crystal molecules along a specific direction. Accordingly, since control of the liquid crystal molecules significantly affects image stabilization of the LCD device, formation of the alignment layer is critical for fabricating an LCD device that produces quality images.

FIG. 3 is a schematic cross sectional view of a method for forming an alignment layer using a roller coating method according to the related art. In FIG. 3, an alignment material 21 is uniformly supplied using a dispenser 20 having an injector shape between an anylox roll 22 and a cylindrically-shaped doctor roll 23 as the anylox roll 22 and the doctor roll 23 rotate. Then, the alignment material 21 formed on a surface of the anylox roll 22 is transferred onto a rubber plate 25 when the anylox roll 22 rotates to contact a printing roll 24 upon which the rubber plate 25 is attached. The rubber plate 25 is aligned with a substrate 26 upon which the alignment material 21 will be applied, and a mask pattern is formed on the rubber plate 25 in order to selectively print the alignment layer on the substrate 26.

As a printing table 27, upon which the substrate 26 is loaded, is moved to contact the printing roll 24, the alignment material 21 is transferred onto the rubber plate 25 and is re-transferred onto the substrate 26 to form an alignment layer. Since a thickness of the alignment layer is about 500–1000 Å, thickness differences of 100 Å of the alignment layer may generate a blot on the screen of the LCD device. Accordingly, uniform thickness of the alignment layer is critical to display quality images on the screen of the LCD device.

However, since the dispenser 20 supplies the alignment material 21 onto the anylox roll 22 using a left-to-right motion along an upper part of the anylox roll 22, uniform thickness of the resulting alignment layer may not be achieved. For example, as a size of the substrate 26 increases, it becomes increasingly more difficult to form the alignment layer having a uniform thickness. Moreover, since all of the alignment material 21 transferred onto the rubber plate 25 is not necessarily perfectly re-transferred onto the substrate 26, a significant amount of the alignment material 21 is wasted, as compared to the amount of alignment material 21 that is re-transferred onto the substrate 26. Accordingly, the amount of wasted alignment material 21 unnecessarily increases production costs. In addition, when a model of the LCD device changes according to the size of the substrate, the doctor roll, anylox roll, and printing roll must be replaced. Moreover, since a cleaning process is periodically performed, the process is complicate and productivity deteriorates. Furthermore, as the substrate is enlarged in size, the size of the anylox roll and the printing roll inevitably increases. That is, as the size of substrates increases, the corresponding fabrication equipment also increases, thereby making it difficult to maintain a uniform thickness of the alignment layer.

SUMMARY OF THE INVENTION

Accordingly, the present invention is directed to an apparatus for forming an alignment film of a liquid crystal display device and a method for forming an alignment film using the same that substantially obviates one or more of the problems due to limitations and disadvantages of the related art.

An object of the present invention is to provide an apparatus for forming a uniform alignment layer of a liquid crystal display device.

Another object of the present invention is to provide an apparatus for forming a uniform alignment layer of a liquid crystal display device having a reduced amount of waste material.

Another object of the present invention is to provide an apparatus for forming a uniform alignment layer of a liquid crystal display device capable of preventing generation of defects.

Another object of the present invention is to provide a method for forming a uniform alignment layer of a liquid crystal display device.

Another object of the present invention is to provide a method for forming a uniform alignment layer of a liquid crystal display device having a reduced amount of waste material.

Another object of the present invention is to provide a method for forming a uniform alignment layer of a liquid crystal display device capable of preventing generation of defects.

To achieve these and other advantages and in accordance with the purpose of the present invention, as embodied and broadly described, a method for forming an alignment layer of a liquid crystal display device includes providing a substrate having a plurality of unit panels formed thereon, loading the substrate onto a stage, selectively dropping an alignment material onto unit panel areas by using an alignment material dropping unit having a plurality of heads, each of the plurality of heads having a plurality of holes, and removing the alignment material remaining on a surface of the holes using an alignment material removal unit connected to the alignment material dropping unit.

In another aspect, an apparatus for forming an alignment layer of a liquid crystal display device includes an alignment material dropping unit for dropping an alignment material onto a substrate, an alignment material supply unit for supplying the alignment material to the alignment material dropping unit, and a residual alignment material removal unit connected to the alignment material dropping unit for removing an alignment material remaining on the surface of holes by withdrawing the alignment material inside the alignment material dropping unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
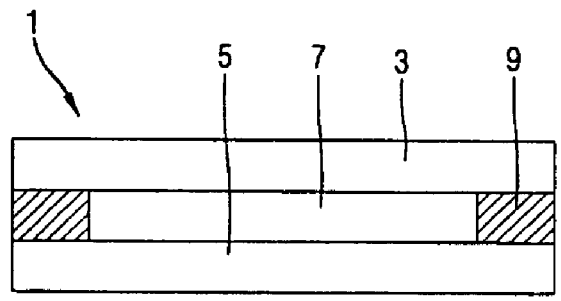
FIG. 1 is a cross sectional view of a liquid crystal display device according to the related art.
Figure 2:
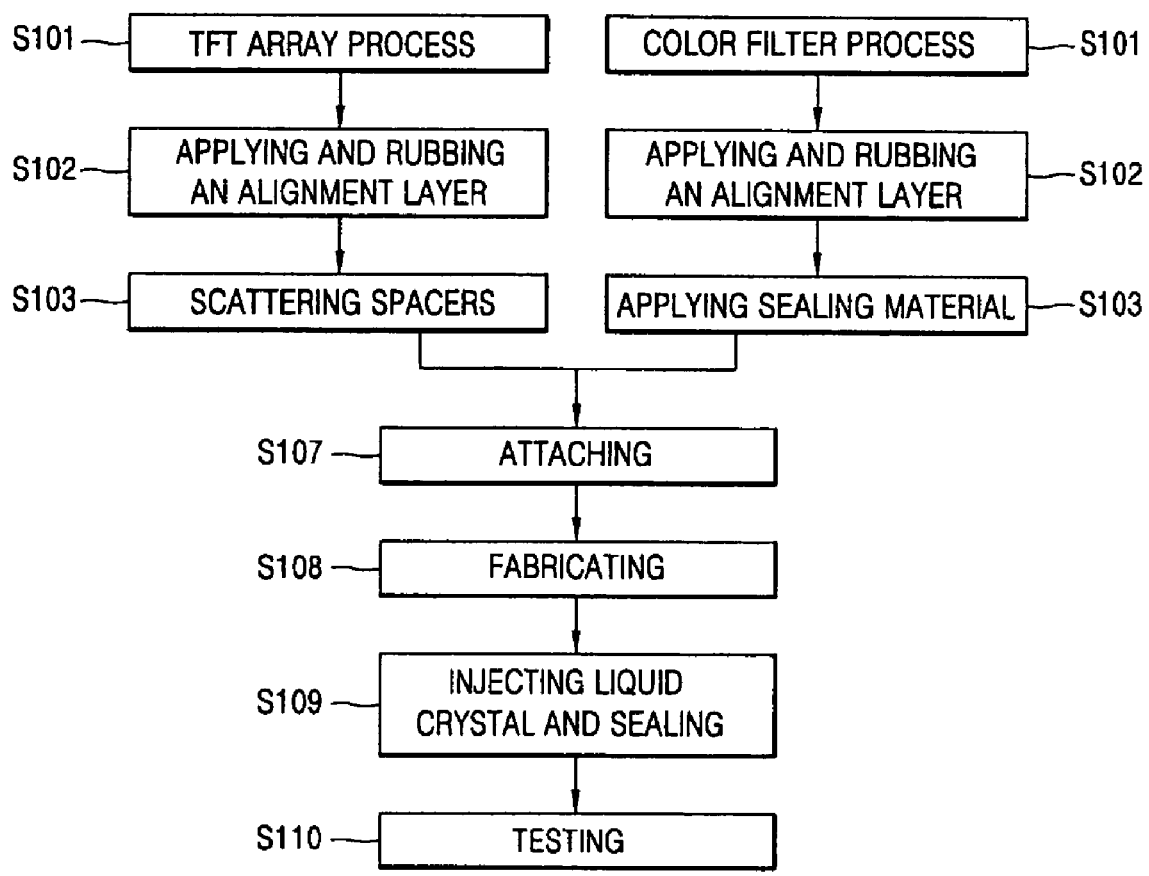
FIG. 2 is a flow chart of a method for fabricating a liquid crystal display device according to the related art.
Figure 3:
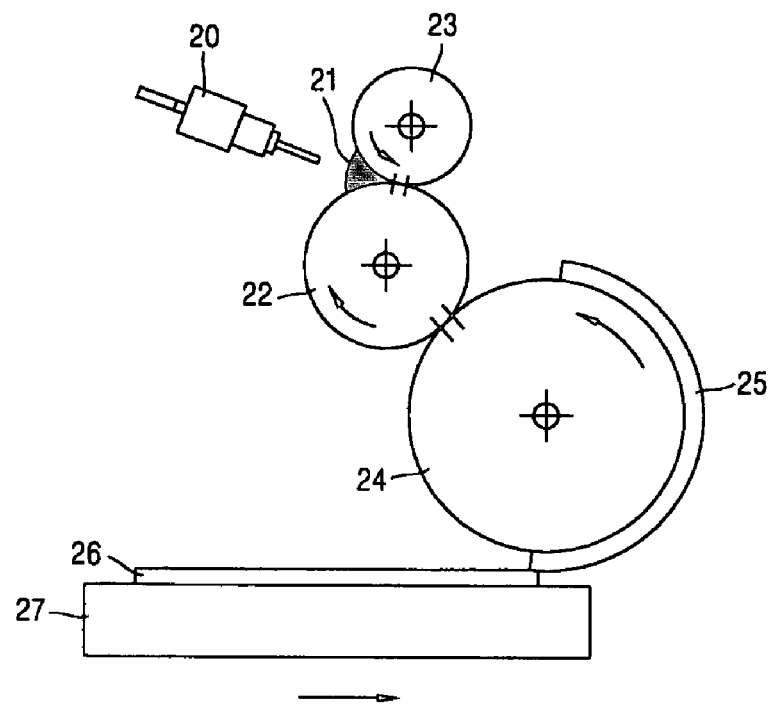
FIG. 3 is a schematic cross sectional view of a method for forming an alignment layer according to the related art.
Figure 4:
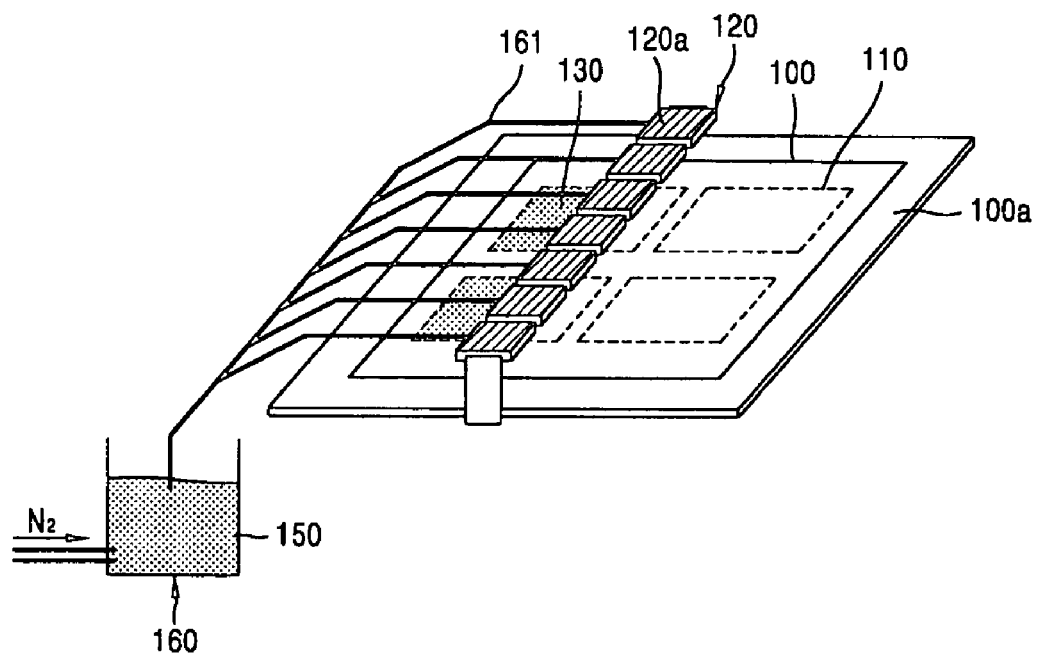
FIG. 4 is a perspective view of an exemplary apparatus for forming alignment film of liquid crystal display device according to the present invention.

FIG. 4 is a perspective view of an exemplary apparatus for forming an alignment film of a liquid crystal display device according to the present invention. In FIG. 4, an alignment layer forming apparatus may include an alignment material dropping unit 120 for dropping an alignment material onto a substrate 100 and a stage 100a upon which the alignment material dropping unit 120 and the substrate 100 may be loaded. After the substrate 100 is loaded onto the stage 100a, an alignment layer 130 may be formed. The substrate 100 may include a mother glass upon which a plurality of unit panels may be formed, such as the thin film transistor array substrate formed by a thin film transistor fabrication process or a color filter substrate 110 formed by a color filter fabrication process.

During the thin film transistor array fabrication process, a first transparent substrate may be provided, a plurality of gate lines and data lines may be provided along vertical and horizontal directions on the substrate to define a plurality of pixel areas, a plurality of thin film transistors may be formed, a driving device may be formed within each of the pixel areas and may be connected to the gate lines and data lines, a passivation layer may be formed along an entire surface of the thin film transistors and the pixel areas, and a plurality of transparent pixel electrodes may be formed thereon. During the color filter fabrication process, a second transparent substrate may be prepared, upon which a black matrix may be formed, and a color filter may be formed at areas corresponding to the pixel areas, upon which a common electrode may be formed.

Then, an alignment layer 130 may be formed on the substrate 100 by using an alignment layer forming apparatus that may employ an ink-jet method, and may include an alignment material dropping unit 120 for directly dropping an alignment material onto the substrate 100, an alignment material supply unit 160 for supplying an alignment material 150 to the alignment material dropping unit 120, and an alignment material supply pipe 161 for connecting the alignment material dropping unit 120 and the alignment material supply unit 160 and supplying the alignment material 150 to the alignment material dropping unit 120.

The alignment material dropping unit 120 may include a plurality of holes, wherein a supply amount of the alignment material to be dropped onto the substrate and a dropping position of the alignment material may be controlled by opening and closing the holes, either individually or in groups. In addition, an alignment layer process time may be controlled by controlling the number of holes. Moreover, the alignment layer process time may be controlled by controlling which ones of the number of holes are opening and/or closed.

When a nitrogen gas (N2) is supplied to the alignment material supply unit 160 storing the alignment material 150, pressure in the alignment material supply unit 160 may increase due to the nitrogen gas. Accordingly, the alignment material 150 may be introduced into the alignment material dropping unit 120 through the alignment material supply pipe 161. Thus, the introduced alignment material may be dropped onto the substrate 100 through the holes formed at the alignment material dropping unit 120, thereby forming a uniform alignment layer on the substrate 100.

Formation of the alignment layer may be accomplished according to movement of the stage upon which the substrate is positioned, or according to movement of the alignment material dropping unit 120. Accordingly, an alignment layer 130 may be selectively formed in a region of the substrate 100 where the alignment material dropping unit 120 has passed. In this case, the alignment layer 130 may be selectively formed by closing some of the holes formed at the alignment material dropping unit 120 when the alignment material dropping 120 is moved over the stage (not shown) to supply the alignment material 130a onto the substrate 100. The area of the as-formed alignment layer may be substantially the area where the thin film transistor array and the color filter substrate have been formed. Alternatively, the area of the as-formed alignment layer may be substantially greater than or smaller than the area where the thin film transistor array and the color filter substrate have been formed.

The alignment material dropping unit 120 may include at least one head 120a having the plurality of holes with which to control the alignment material dropping area according to a size of the substrate 100. Accordingly, the alignment material dropping unit 120 may accommodate large-sized substrates by increasing the number of heads 120a.

Figure 5:
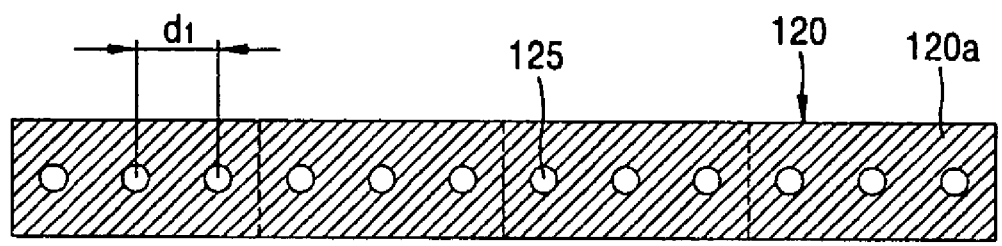
FIG. 5 is a schematic plan view of an exemplary bottom of an alignment material dropping unit according to the present invention.

FIG. 5 is a schematic plan view of an exemplary bottom of an alignment material dropping unit according to the present invention. In FIG. 5, an alignment material dropping unit 120 may include a linear array of the plurality of heads 120a, where each of the heads 120a may include a plurality of holes 125 spaced apart at regular interval distances d1. Accordingly, the alignment material may be dropped onto the substrate through the holes 125. Thus, by changing a diameter of the holes 125 and changing the interval distances d1 between holes 125, a thickness of the alignment layer and uniformity of the thickness of the alignment layer formed on the substrate may be controlled. In addition, since each of the holes 125 may be opened and/or closed, either individually or in groups, even for a multi-model glass having two or more substrate models, the alignment layer may be easily formed by selectively opening and/or closing the holes 125.

Accordingly, the alignment layer forming apparatus using the ink-jet method may accommodate various substrate models and large-sized substrates. In addition, since amounts of alignment material may be dropped directly onto the substrate, consumption of the alignment material may be minimized, thereby reducing fabrication costs of the liquid crystal display device.

However, after dropping the alignment material, the alignment material may remain on a surface of the head. Accordingly, as the alignment material hardens, the holes of the head may become clogged. Thus, it may not be possible to accurately drop the alignment material at desired positions on the substrate, thereby causing formation of a defective alignment layer.

Figure 6:
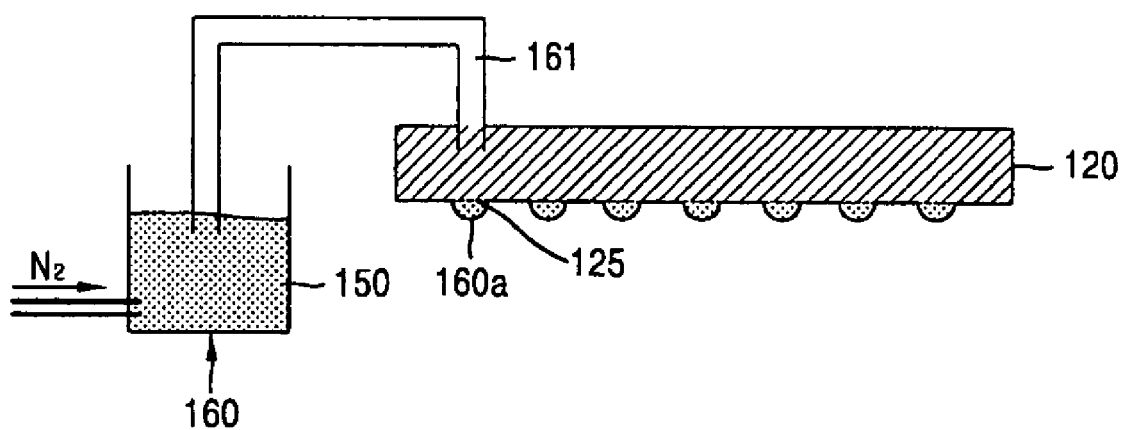
FIG. 6 is a schematic cross sectional view of an alignment material remaining on a surface of a hole of an alignment material dropping unit.

FIG. 6 is a schematic cross sectional view of an alignment material remaining on a surface of a hole of an alignment material dropping unit. In FIG. 6, an alignment material 160a may remain on a surface of the holes 125 of the alignment material dropping unit 120 due to the viscosity of the alignment material. For example, after the alignment material is dropped onto the substrate through the holes 125, some alignment material may remain on the surface of the holes 125. Accordingly, the alignment material 160a remaining on the surface of the holes 125 may harden, thereby clogging the holes 125 and forming a defective alignment layer. Thus, the alignment material 160a clogging the interior of the hole 125 must be removed to ensure smooth supply of the alignment material The alignment material 160a remaining in the holes 125 may be removed by using a wiper, wherein the alignment material remaining at the holes 125 may be rubbed away by the wiper. Then, the holes 125 may be rinsed with a cleansing solution, such as NMP or IPA, thereby removing the alignment material remaining at the head 120a (in FIG. 4). Although this wiping operation may be performed manually by an operator when the alignment material is replaced, complete removal of hardened alignment material at the holes 125 and on the surface of the holes 125 may not be achieved.

Therefore, according to the present invention, an alignment material removal unit for removing alignment material may be provided at the alignment material dropping unit. According to the alignment material removal unit, alignment material remaining on the surface of the hole may be completely withdrawn back into the head, thereby preventing clogging of the holes due to hardening of remaining alignment material.

Figure 7:
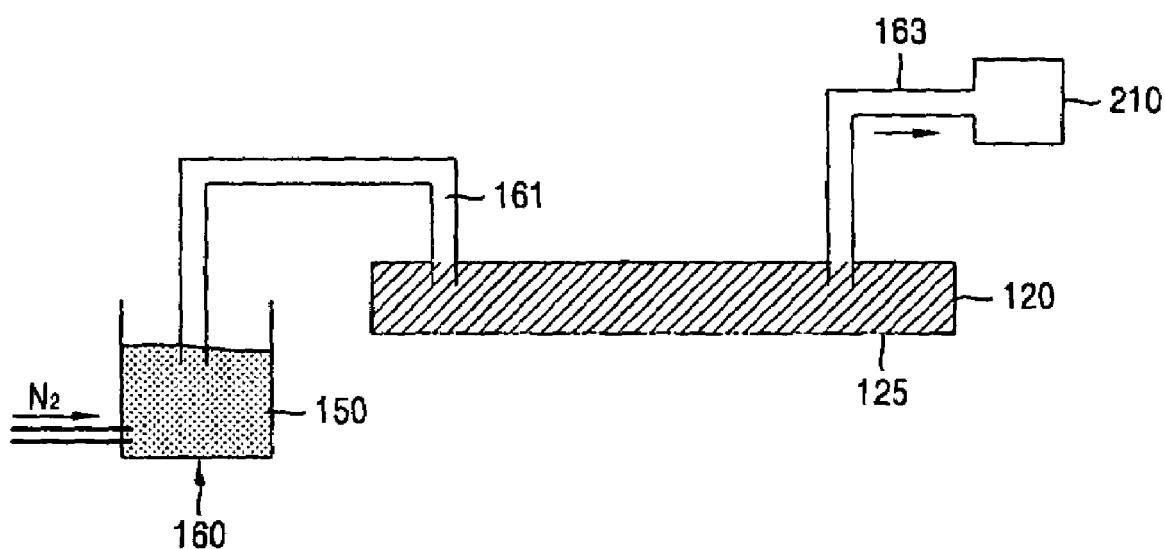
FIG. 7 is a schematic cross sectional view of an alignment material remaining on a surface of a hole of an exemplary alignment material dropping unit according to the present invention.

FIG. 7 is a schematic cross sectional view of an alignment material remaining on a surface of a hole of an exemplary alignment material dropping unit according to the present invention. In FIG. 7, elements, except for an alignment material removal unit 210, are shown to be the same as those of FIG. 6, and the same reference numerals are given to the same elements.

In FIG. 7, an alignment material removal step may include removing alignment material remaining on surfaces of the holes 125 by applying a vacuum pressure into the head 120, thereby backflushing remaining alignment material from the head 120. For example, the alignment material removal unit 210 may include an alignment material removal pipe 163 connected to the alignment material dropping unit 120 for backflushing portions of the alignment material filled in the alignment material dropping unit 120, and an alignment material supply pipe 161 for supplying an alignment material 150 to the alignment material dropping unit 120 from the alignment material supply unit 160. Accordingly, any remaining alignment material on the surfaces of the holes 125 may be completely and effectively drawn back into the alignment material dropping unit 120.

According to the present invention, a method for fabricating a liquid crystal display device includes formation of a uniform alignment layer by using an alignment layer forming apparatus that may include a head having a plurality of holes. Thus, the alignment layer forming method of the present invention may accommodate large-sized substrates by controlling a total number of heads, thereby increasing fabrication efficiency. In addition, according to the present invention, since amounts of alignment material may be dropped at regions of a substrate where an alignment layer is to be formed, the alignment material may not be wasted, thereby reducing fabrication costs. In addition, after the alignment material is dropped, the alignment material remaining on the surface of the holes may be effectively removed through an alignment material removal unit and an alignment material removal step. Thus, clogging of the holes may be prevented, thereby reducing processing time and increasing productivity.

It will be apparent to those skilled in the art that various modifications and variations can be made in the apparatus for forming alignment film of liquid crystal display device and method for forming alignment film using the apparatus of the present invention without departing from the spirit or scope of the invention. Thus, it is intended that the present invention cover the modifications and variations of this invention provided they come within the scope of the appended claims and their equivalents.

What is claimed is:

1. A method for forming an alignment layer of a liquid crystal display device, comprising:
   providing a substrate having a plurality of unit panels formed thereon;
   loading the substrate onto a stage;
   selectively dropping an alignment material onto unit panel areas by using an alignment material dropping unit having a plurality of heads, each of the plurality of heads having a plurality of holes; and
   backflushing the alignment material remaining on a surface of the holes using an alignment material removal unit connected to the alignment material dropping unit.

2. The method according to claim 1, wherein the selective dropping of the alignment material is performed by movement of the stage.

3. The method according to claim 1, wherein the selective dropping of the alignment material is performed by movement of the alignment material dropping unit.

4. The method according to claim 1, wherein, during the step of backflushing the alignment material remaining on the surface of the holes, the alignment material remaining on the surface of the hole is withdrawn by an alignment material removal pipe connected to the alignment material dropping unit.

5. The method according to claim 1, wherein an amount of alignment material to be dropped onto the substrate is controlled by opening and closing of the holes.

6. The method according to claim 1, wherein an amount of alignment material to be dropped onto the substrate is controlled according to a diameter of the holes.

7. An apparatus for forming an alignment layer of a liquid crystal display device, comprising:
   an alignment material dropping unit having holes for dropping an alignment material onto a substrate;
   an alignment material supply unit for supplying the alignment material to the alignment material dropping unit; and
   a residual alignment material removal unit connected to the alignment material dropping unit for removing an alignment material remaining on a surface of the holes, wherein the residual alignment material removal unit is configured to backflush the alignment material inside the alignment material dropping unit.

8. The apparatus according to claim 7 further comprising an alignment material supply pipe for connecting the alignment material dropping unit and the alignment material supply unit.

9. The apparatus according to claim 7, where in the alignment material dropping unit includes at least one head having a plurality of holes.

10. The apparatus according to claim 7, further comprising a stage which is moveable.

11. The apparatus according to claim 10, wherein the stage moves relative to the alignment material dropping unit.

12. The apparatus according to claim 7, wherein the alignment material dropping unit is movable.

13. The apparatus according to claim 12, wherein the alignment material dropping unit moves relative to the stage.

14. The apparatus according to claim 7, further comprising a stage, wherein the stage and alignment material dropping unit both move relative to each other.

15. The apparatus according to claim 7, wherein the dropping of the alignment material is controlled by opening and closing the holes.

* * * * *